US 11,672,014 B2

(12) United States Patent
Selvaganapathy (10) Patent No.: US 11,672,014 B2
(45) Date of Patent: Jun. 6, 2023

(54) TRANSMISSION OF A SHORT CONTENTION RESOLUTION IDENTIFIER

(71) Applicant: Nokia Technologies Oy, Espoo (FI)

(72) Inventor: Srinivasan Selvaganapathy, Bangalore (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 121 days.

(21) Appl. No.: 16/979,343

(22) PCT Filed: Mar. 12, 2019

(86) PCT No.: PCT/FI2019/050205
§ 371 (c)(1),
(2) Date: Sep. 9, 2020

(87) PCT Pub. No.: WO2019/193243
PCT Pub. Date: Oct. 10, 2019

(65) Prior Publication Data
US 2021/0007148 A1    Jan. 7, 2021

(30) Foreign Application Priority Data
Apr. 5, 2018  (IN) .............. 201841013040

(51) Int. Cl.
*H04W 74/08* (2009.01)
*H04W 72/23* (2023.01)

(52) U.S. Cl.
CPC ....... *H04W 74/0833* (2013.01); *H04W 72/23* (2023.01)

(58) Field of Classification Search
CPC ........... H04W 72/042; H04W 74/0833; H04W 72/04; H04W 74/08
See application file for complete search history.

(56) References Cited

U.S. PATENT DOCUMENTS

| | | | |
|---|---|---|---|
| 2013/0083753 A1 | 4/2013 | Lee et al. | |
| 2017/0374542 A1* | 12/2017 | Ryu | ............ H04W 28/14 |
| 2018/0139668 A1* | 5/2018 | Takahashi | ............ H04W 76/14 |

(Continued)

FOREIGN PATENT DOCUMENTS

ES    2620801 T3    6/2017

OTHER PUBLICATIONS

"Consideration of T300 and Contention Resolution Timer for EDT in eFeMTC and FeNB-IoT", 3GPP TSG-RAN WG2 #101, R2-1803415, Agenda : 9.14.2 , Kyocera, Feb. 26-Mar. 2, 2018, 4 pages.
Condoluci et al., "Enabling the IoT Machine Age With 5G: Machine-Type Multicast Services for Innovative Real-Time Applications", IEEE Access, vol. 4, May 26, 2016, pp. 5555-5569.

(Continued)

*Primary Examiner* — Chi Ho A Lee
(74) *Attorney, Agent, or Firm* — Squire Patton Boggs (US) LLP (57) ABSTRACT

Various communication systems may benefit from improved random access procedures. For example, it may be helpful to improve random access procedure when a network entity does not have any downlink data to transmit. A method, according to certain embodiments, may include receiving at a network entity from a user equipment a short contention resolution identifier. The method may also include transmitting from the network entity to the user equipment downlink control information comprising at least the short contention resolution identifier on a physical downlink control channel.

17 Claims, 4 Drawing Sheets

(56) References Cited

U.S. PATENT DOCUMENTS

| | | | |
|---|---|---|---|
| 2018/0220468 A1* | 8/2018 | Lin | H04W 74/008 |
| 2019/0159257 A1* | 5/2019 | Rico Alvarino | H04W 72/04 |
| 2019/0215872 A1* | 7/2019 | Park | H04W 74/0833 |
| 2019/0268949 A1* | 8/2019 | Menon | H04L 5/0098 |
| 2019/0350002 A1* | 11/2019 | Chen | H04W 74/002 |
| 2019/0350037 A1* | 11/2019 | Lee | H04W 76/27 |
| 2019/0357267 A1* | 11/2019 | Martin | H04W 74/0833 |
| 2019/0357272 A1* | 11/2019 | Lim | H04W 74/0841 |
| 2020/0068608 A1* | 2/2020 | Ye | H04W 72/048 |
| 2020/0137600 A1* | 4/2020 | Ericson | H04W 74/0833 |
| 2020/0170043 A1* | 5/2020 | Fu | H04W 74/004 |
| 2020/0187245 A1* | 6/2020 | Fujishiro | H04W 72/0413 |
| 2020/0374921 A1* | 11/2020 | Li | H04W 68/005 |
| 2021/0022185 A1* | 1/2021 | Fujishiro | H04W 74/0833 |
| 2021/0337597 A1* | 10/2021 | Yoshimura | H04W 74/0833 |

OTHER PUBLICATIONS

"5G—Pre Trial—RACH", Sharetechnote, Retrieved on Sep. 8, 2020, Webpage available at : http://www.sharetechnote.com/html/5G/5G_PreTrial_RACH.html.

International Search Report and Written Opinion received for corresponding Patent Cooperation Treaty Application No. PCT/FI2019/050205, dated May 27, 2019, 12 pages.

"Contention Resolution Identifier for GERAN R5", 3GPP TSG GERAN #5, Tdoc GP-011162, Agenda : 7 .2.5.9, Siemens, May 28-Jun. 1, 2001, pp. 1-7.

"Summary of email discussion [NR-AH1 #13][NR] UL data in Inactive", 3GPP TSG-RAN WG2 #97, R2-1701125, Agenda : 10.2.2.2, Huawei, Feb. 13-17, 2017, pp. 1-50.

"Support for Contention Resolution ID for eMTC ModeB", 3GPP TSG-RAN2 #98, R2-1704561, Agenda : 7.3, Rohde & Schwarz, May 15-19, 2017, 3 pages.

First Examination Report issued in corresponding Indian Patent Application No. 201841013040 dated Aug. 16, 2022.

* cited by examiner

Figure 1

| Parameter Name | Description |
| --- | --- |
| UE Identity | Rel-13 IE in RRC Connection Request |
| Establishment Cause | Rel-13 IE in RRC Connection Request |
| MultiTone Support | Rel-13 IE in RRC Connection Request |
| MultiCarrier Support | Rel-13 IE in RRC Connection Request |
| Short Contention Resolution Identifier | New IE<br>Choice<br>{ Short Identifier : 16 bits<br>Last two bytes of UE Identity : 1 bit<br>} |
| User Data | Remaining Bits until maximum TBS Size |

| DCI-Format-N1 with MSG3-ACK Indicator | |
| --- | --- |
| Field | # of Bits |
| Flag for format N0/format N1 differentiation | 1 |
| NPDCCH Order /MSG3-ACK Indicator | 1 (Value=1) |
| MSG3-ACK Indicator | 1 (Value=1) |
| Short Contention Resolution Identifier | 16 |
| Spare bits | 4 |
| DCI-Format-N1 with NDPCCH Order Indicator | |
| Field | # of Bits |
| Flag for format N0/format N1 differentiation | 1 |
| NPDCCH Order /MSG3-ACK Indicator | 1 (Value=1) |
| MSG3-ACK Indicator | 1 (Value=0) |
| Starting Repetition | 2 |
| NPRACH Subcarrier Index | 6 |
| Spare bits | 12 |

TRANSMISSION OF A SHORT CONTENTION RESOLUTION IDENTIFIER

CROSS-REFERENCE TO RELATED APPLICATIONS RELATED APPLICATION

This application was originally filed as PCT Application No. PCT/FI2019/050205, filed on 12 Mar. 2019, which claims priority from India Application No. 201841013040, filed on 5 Apr. 2018, each of which is incorporated herein by reference in its entirety.

BACKGROUND

Field

Various communication systems may benefit from improved random access procedures. For example, it may be helpful to improve random access procedure when a network entity does not have any downlink data to transmit.

Description of the Related Art

Third Generation Partnership Project (3GPP) technology, such as Internet of Things (IoT), has been developed to allow for the exchange of small data transmissions between a massive network of physical device, vehicles, home appliances, and other items. In particular, the IoT network allows for items embedded with electronics, sensors, and/or actuators to communicate with each another, and with other existing 3GPP technologies, such as Long Term Evolution (LTE) or LTE-Advanced (LTE-A). Narrowband IoT (NB-IoT) is a cellular technology that has been developed to provide wide-area coverage for IoT. NB-IoT provides for deployment flexibility, low device complexity, long battery lifetime, support of massive number of devices in a cell, and significant coverage extension beyond existing cellular technologies. One of the goals of NB-IoT is to reduce the amount of signaling needed for transmission of uplink or downlink small data.

In NB-IoT technology, narrowband physical random access channel (NPRACH) procedures are used to connect an IoT device or a user equipment to a network. While the random access procedures are generally triggered or initiated by the IoT device or the user equipment, in some cases the random access procedures may be triggered or initiated by the network. The initiation of random access procedures at the network occurs when the user equipment is not synchronized with the network.

SUMMARY

According to certain embodiments, an apparatus may include at least one memory including computer program code, and at least one processor. The at least one memory and the computer program code may be configured, with the at least one processor, to cause the apparatus at least to receive from a user equipment a short contention resolution identifier. The at least one memory and the computer program code may also be configured, with the at least one processor, to cause the apparatus at least to transmit to the user equipment downlink control information comprising at least the short contention resolution identifier on a physical downlink control channel.

A method, according to certain embodiments, may include receiving at a network entity from a user equipment a short contention resolution identifier. The method may also include transmitting from the network entity to the user equipment downlink control information comprising at least the short contention resolution identifier on a physical downlink control channel.

An apparatus, in certain embodiments, may include means for receiving from a user equipment a short contention resolution identifier. The apparatus may also include means for transmitting to the user equipment downlink control information comprising at least the short contention resolution identifier on a physical downlink control channel.

According to certain embodiments, a non-transitory computer-readable medium encoding instructions that, when executed in hardware, perform a process. The process may include receiving at a network entity from a user equipment a short contention resolution identifier. The process may also include transmitting from the network entity to the user equipment downlink control information comprising at least the short contention resolution identifier on a physical downlink control channel.

According to certain other embodiments, a computer program product may encode instructions for performing a process. The process may include receiving at a network entity from a user equipment a short contention resolution identifier. The process may also include transmitting from the network entity to the user equipment downlink control information comprising at least the short contention resolution identifier on a physical downlink control channel.

An apparatus, according to certain embodiments, may include circuitry for receiving at a network entity from a user equipment a short contention resolution identifier. The apparatus may also include circuitry for transmitting from the network entity to the user equipment downlink control information comprising at least the short contention resolution identifier on a physical downlink control channel.

According to certain embodiments, an apparatus may include at least one memory including computer program code, and at least one processor. The at least one memory and the computer program code may be configured, with the at least one processor, to cause the apparatus at least to transmit to a network entity a short contention resolution identifier. The at least one memory and the computer program code may also be configured, with the at least one processor, to cause the apparatus at least to receive from the network entity downlink control information comprising at least the short contention resolution identifier on a physical downlink control channel.

A method, according to certain embodiments, may include transmitting from a user equipment to a network entity a short contention resolution identifier. The method may also include receiving at the user equipment from the network entity downlink control information comprising at least the short contention resolution identifier on a physical downlink control channel.

An apparatus, in certain embodiments, may include means for transmitting to a network entity a short contention resolution identifier. The apparatus may also include means for receiving from the network entity downlink control information comprising at least the short contention resolution identifier on a physical downlink control channel.

According to certain embodiments, a non-transitory computer-readable medium encoding instructions that, when executed in hardware, perform a process. The process may include transmitting from a user equipment to a network entity a short contention resolution identifier. The process may also include receiving at the user equipment from the network entity downlink control information comprising at least the short contention resolution identifier on a physical downlink control channel.

According to certain other embodiments, a computer program product may encode instructions for performing a process. The process may include transmitting from a user equipment to a network entity a short contention resolution identifier. The process may also include receiving at the user equipment from the network entity downlink control information comprising at least the short contention resolution identifier on a physical downlink control channel.

An apparatus, according to certain embodiments, may include circuitry for transmitting from a user equipment to a network entity a short contention resolution identifier. The apparatus may also include circuitry for receiving at the user equipment from the network entity downlink control information comprising at least the short contention resolution identifier on a physical downlink control channel.

BRIEF DESCRIPTION OF THE DRAWINGS

For proper understanding of the invention, reference should be made to the accompanying drawings, wherein.

DETAILED DESCRIPTION

Certain embodiments allow for secure early transmissions of uplink data over an air interface using message 3 in a random access channel procedure, for example an NPRACH procedure. In addition, a network entity, such as an enhanced NodeB (eNB) or any other network node, may transmit a short contention resolution identifier on a physical downlink control channel (PDCCH) or a narrowband PDCCH (NPDCCH) to a user equipment. A short contention resolution identifier may be an identifier having a size or length that fits within the downlink control information or the NPDCCH. For example, the short contention resolution identifier may have a length that is shorter than 48 bits. The shortening of the contention resolution identifier may allow for the transmission of the identifier on a control channel, rather than having to use a physical shared data channel (PSDCH) to transmit the contention resolution.

In some embodiments, early data transmissions for the NB-IoT system may be configured using the user plane. The early data transmissions may occur during RACH access procedures. One of the aims of early data transmissions is to support single small data transmission in either uplink or downlink without additional signaling overhead. While the early data transmission may be included in a message 3 (Msg3) of a random access channel (RACH) procedure, a message 4 (Msg4) may still be transmitted even if there is no downlink data or downlink acknowledgement expected for the small data. By using a shorter contention resolution identifier, the RACH procedure may terminate faster, thereby allowing the UE to enter a sleep mode earlier. Using a shorter contention resolution identifier, and transmitting the contention resolution identifier on the PDCCH, also helps to improve resource efficiency by avoiding PDSCH resources allocation for transmission of Msg4.

As part of the RACH procedures, a user equipment (UE) may send a preamble from a set of preambles reserved for early data transmission to a network entity. The sending of the preamble may be included in a message 1 (Msg1). The network entity, such as the eNB, may respond with a random access response when it receives the preamble from the UE. The random access response may include at least one a timing advance, an uplink grant, or a temporary cell radio network temporary identifier (C-RNTI). The random access response may be referred to as a message 2 (Msg2). The uplink grant, for example, may indicate a larger size transport block size (TBS) for early data transmission in some embodiments in which the eNB decides to allocate a TBS that is larger than 88 bits. The timing advance and the temporary C-RNTI included in Msg2 may be used by the UE to decode a PDCCH, such as a NPDCCH.

In response to receiving Msg2, the UE may transmit a message 3 (Msg3) that includes a user packet along with additional information. Msg3 may also include an existing radio resource control (RRC) connection request message content. The request message content may be used by the receiving network entity for contention resolution. Contention resolution, for example, may be performed by the network entity when a plurality of UEs attempt to connect to the network at the same time. The network entity may then use the C-RNTI to transmit a resource allocation for a narrowband PDSCH (NPDSCH). The resource allocation may be transmitted from the network entity to the UE via NPDCCH. The message may be referred to as a Msg4.

If early data transmissions from the UE to the network entity requires an acknowledgement from an application server via a downlink early data transmission, additional time may be needed for the application server to transmit the acknowledgement to the UE through the network entity and the core network. Some uplink early data transmissions may be connectionless, and may not use any application level acknowledgement. Instead, the UE may only receive an acknowledgment from the radio interface.

Figure 1:
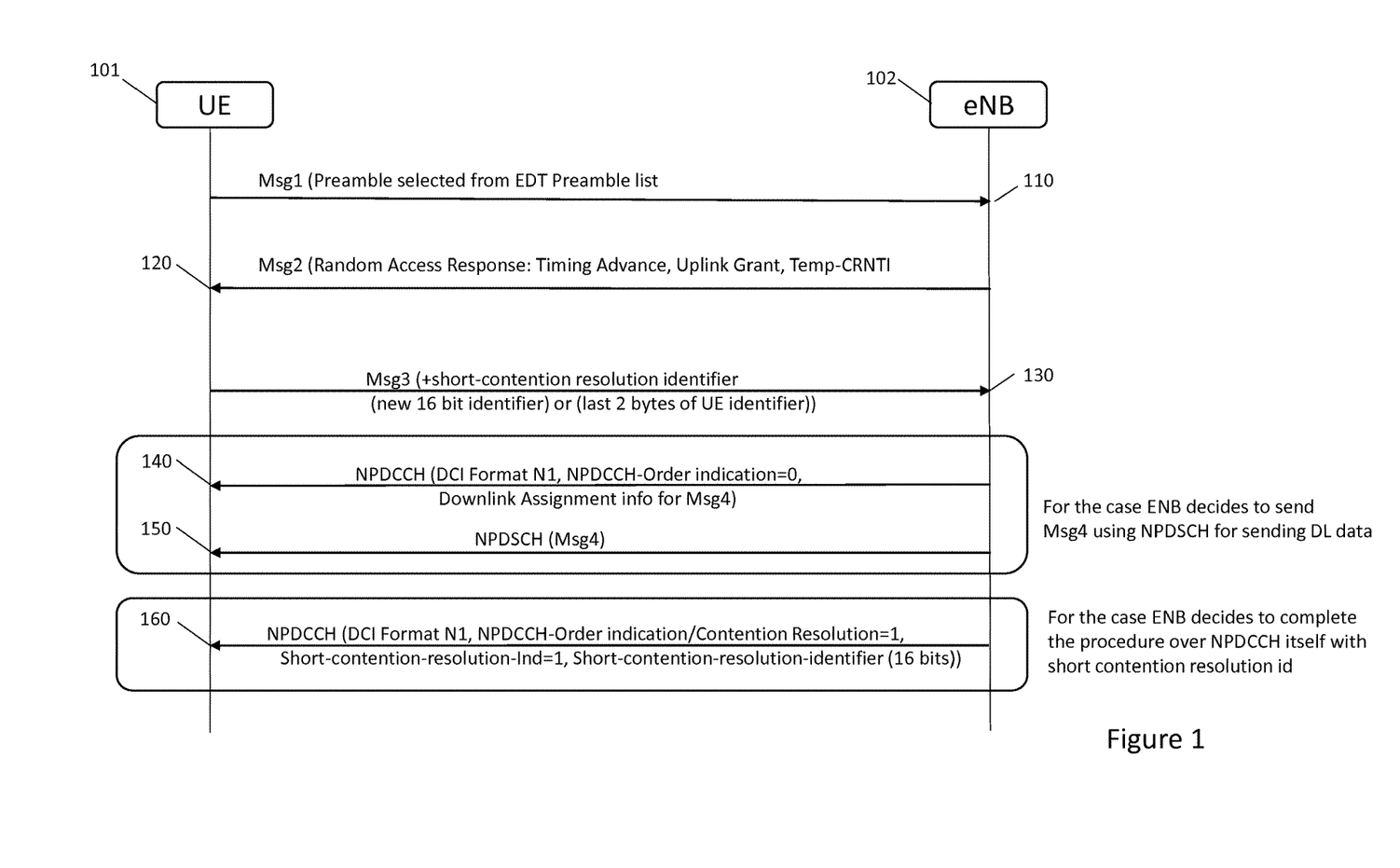
FIG. 1 illustrates an example of a signal flow diagram according to certain embodiments.

As shown in FIG. 1, certain embodiments may allow for completing a RACH procedure for single packet transmission without the use of the NPDSCH. In some embodiments, the eNB may not have any downlink data to transmit in Msg4 and/or the UE may indicate to the network entity that it does not expect to receive an application acknowledgement as part of Msg3. In such embodiments, the contention resolution identity and/or the final acknowledgment may be included in downlink control information (DCI) transmitted from the network entity to the user equipment via the PDCCH.

Because PDCCH does not have a large amount of available payload size, Msg4 has traditionally been transmitted in PDSCH, not in the PDCCH. Certain embodiments, however, are able to shorten the contention resolution identifier, for example from 48 bits to 16 bits, which may allow for the transmission of the contention resolution identifier in the PDCCH. Shortening the contention resolution identifier, in certain embodiments, may allow the transmission of the identifier and the Msg3 acknowledgment in the PDCCH, without the need for transmitting the Msg4 on the PDSCH. In other words, the transmitting of the downlink control information including the short contention resolution identifier replaces Msg4. The RACH procedure for early data transmission may therefore be terminated by using the PDCCH, in some embodiments, without using the PDSCH.

FIG. 1 illustrates an example of a signal flow diagram according to certain embodiments. In particular, the example illustrated in FIG. 1 shows a RACH procedure that utilizes the shorter contention resolution identifier. In step 110, UE 101 transmits Msg1 to a network entity, such as eNB 102. Msg1 may include a preamble from the preamble set for the early data transmission. In step 120, eNB 102 may transmit Msg2 to UE 101, where Msg2 includes a random access response. The ransom access response may include at least one of a timing advance, an uplink grant, and/or a temporary C-RNTI. In step 130, UE 101 may transmit a short contention resolution identifier to eNB 102. In the example shown in FIG. 2, the short contention resolution identifier may be included in a Msg3 transmitted from UE 101 to eNB 102. In other words, Msg3 may carry the early data transmission that includes one additional parameter for contention resolution.

In some embodiments, the short contention resolution identifier may have a length of 16 bits. In yet another embodiment, the short contention resolution identifier may be included in one or more bits of the UE identity transmitted from the eNB 102. For example, the contention resolution identifier may be assigned by the network entity as part of radio resource connection setup. When the UE sends early data in Msg3, it may include the short contention resolution identifier, which may be one or more bits, for example the last 16 bits or N bits, of the identifier assigned by the network entity.

UE 101, for example, may generate the short contention resolution identifier based on a random number. The random number may be hashed and based on an international mobile subscriber identity (IMSI) or a system architecture evolution temporary mobile subscriber identity (S-TMSI). The transmitting of the short contention resolution identifier indicates to eNB 102 that UE 101 does not expect to receive an application acknowledgement to the transmitted Msg3. The short contention resolution identifier may be some specific bits of identifier assigned to the UE by the network entity as part of RRC connection setup. In some other embodiments, the early data transmission may include the 40 bit UE identifier for UE context identification, and some bits of the 40 bit UE identifier may be used by the network entity as a contention resolution identifier. In some other embodiments, the UE may generate the short contention resolution identifier at the UE based on one or more bits of a user identifier transmitted to the UE from the network entity.

When there are pending packets awaiting transmission from eNB 102 to UE 101, or when UE 101 expects an application acknowledgement for the transmitted Msg3, eNB 102 may transmit a DCI format, for example format N1, and a downlink assignment information for Msg4 in the PDCCH, for example an NPDCCH, to UE 101, as shown in step 140. The packets awaiting transmission to UE 101 may be pending at a Serving GPRS Support Node (SGSN), and may be incoming data to eNB 102. In step 140, the message transmitted to UE 101 may include an NPDCCH order indication equal to 0. In step 150, eNB 120 may transmit the pending data packets to UE 101 as part of a Msg4 transmission via NPDSCH.

As an alternative or in addition to steps 140 and 150, in step 160 eNB 102 may transmit downlink control information comprising at least the short contention resolution identifier on a NPDCCH. The transmission of the short contention resolution identifier by eNB 102 via the NPDCCH may terminate the RACH. The transmission shown in step 160 may be sent in NPDCCH and replaces Msg4. The transmission shown in step 160 may be considered a final acknowledgement with a short contention resolution identifier. As shown in step 160, the DCI transmitted to UE 101 from eNB 102 may include at least one of a DCI format indication, such as format N1, an order indicator of the PDCCH or an acknowledgement indicator set to one, a short contention resolution identification set to one, and a short contention resolution identifier. The short contention resolution identifier, for example, may have a length of 16 bits. In some other embodiments, the short contention resolution identifier may have a minimum length of 16 bits.

As illustrated in FIG. 1, in certain embodiments the RACH procedure for early data transmission may be terminated without Msg4 being transmitted or received over NPDSCH. The UE, in some embodiment, may indicate or transmit a short contention resolution identifier to a network entity. The short contention resolution identifier may fit inside a control channel for early termination of the RACH procedure for single small packet transmissions, for example. The short contention resolution identifier may indicate to the network entity that an acknowledgement may not be required. In response, the network entity may transmit a modified DCI to indicate contention resolution to the UE. The modified DCI may be transmitted via the PDCCH, and may include the short contention resolution identifier.

Figures 2, 3:
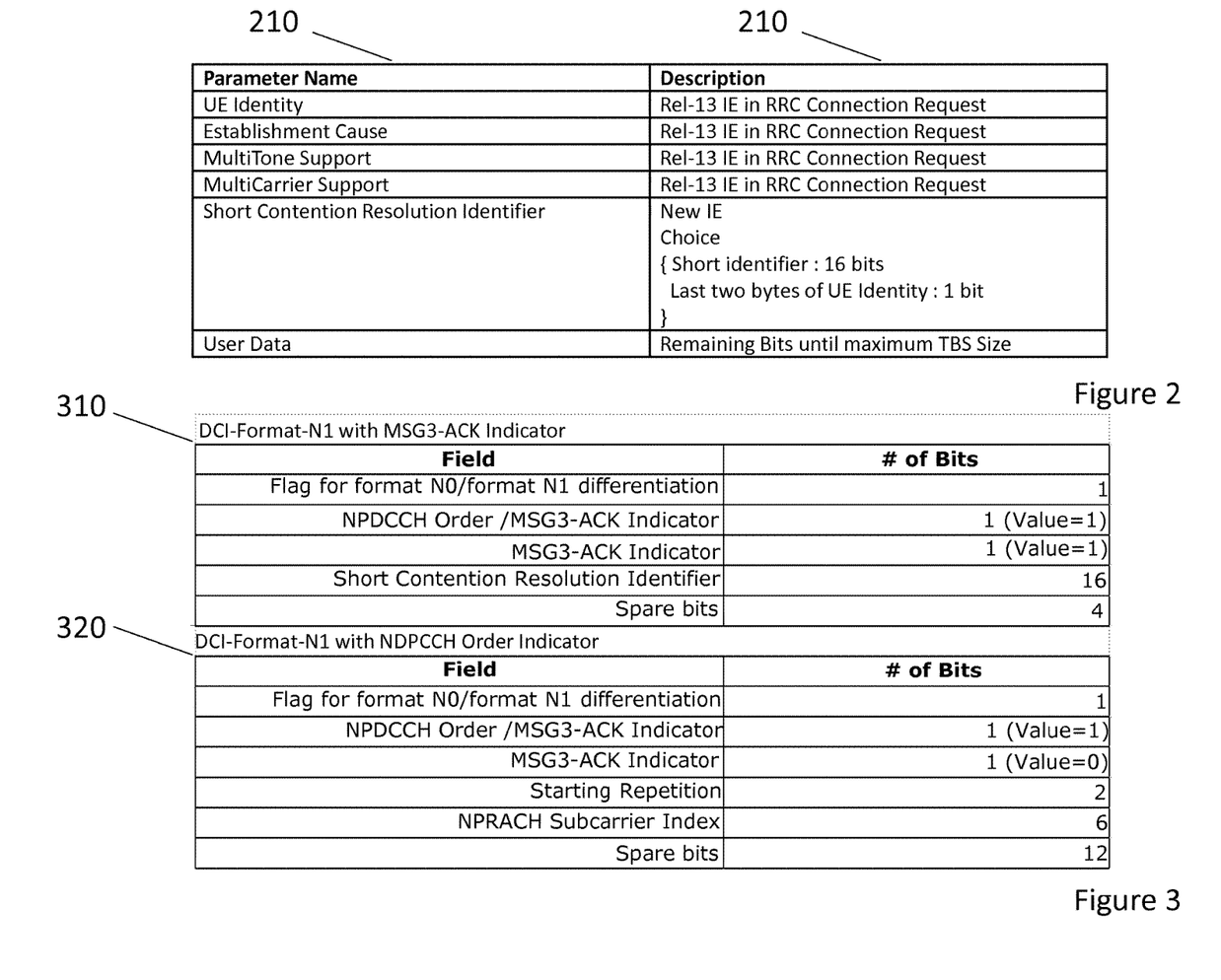
FIG. 2 illustrates an example of a table according to certain embodiments.
FIG. 3 illustrates examples of tables according to certain embodiments.

FIG. 2 illustrates an example of a table according to certain embodiments. In particular, FIG. 2 illustrates the content that may be included in Msg3 to be transmitted from a UE to a network entity, similar to step 130 in FIG. 1. As shown in FIG. 2, the table may include at least one parameter. The at least one parameter may a UE identity, an establishment cause, a multitone support indication, a multicarrier support indication, a user data, and/or a short contention resolution identifier. The short contention resolution identifier may be a short identifier with a length of 16 bits, for example, or may be included as part of the one or more bits of the UE identity transmitted to the UE from the network entity. User data, as shown in FIG. 2, may be transmitted on the remaining bits available for Msg3 transmissions until a maximum TBS is reached.

FIG. 3 illustrates examples of tables according to certain embodiments. In particular, FIG. 3 illustrates DCI that includes a shorter contention resolution identifier, which may be transmitted from the network entity to the UE, similar to steps 140 and 160 in FIG. 1. Table 310 illustrates DCI that includes an acknowledgement indicator, while table 320 includes DCI that includes an order indicator of the PDCCH. The DCI in both table 310 and 320 has a total size of 23 bits. In table 310, the DCI includes 1 bit for a flag for format N0/format N1 differentiation, 1 bit for the NPDCCH order or Msg3 acknowledgement indicator, 1 bit for the Msg3 acknowledgment indicator, 16 bits for the short contention resolution identifier, and 4 spare bits. The value of the Msg3 indicators in the DCI shown in table 310 is 1. A value of 1 may indicate that the DCI includes an Msg3 acknowledgement indicator, as opposed to an NPDCCH order indicator.

In table 320, the DCI may include 1 bit for a flag for format N0/format N1 differentiation, 1 bit for the NPDCCH order or Msg3 acknowledgement indicator, 1 bit for the Msg3 acknowledgment indicator, 2 bits for starting repetition, 6 bits for RACH subcarrier index, and 12 bits for spare bits. A value of the NPDCCH order or Msg3 acknowledgment indicator is 1, while the value of the Msg3 acknowledgment indicator is equal to 0.

Because the temporary C-RNTI may be assigned for the UE transmitting an early data transmission preamble, the DCI may not be decoded by any other legacy UE that does not have the temporary C-RNTI. In other words, the NPDCCH order parameter and the remaining fields in the DCI shown in FIG. 3 may not lead to any backward compatibility issues. For example, when the network entity may want to transmit a Msg4 via NPDSCH, the network entity may set the NPDCCH order or the Msg3 Acknowledgment indicator to a value of zero. This may indicate to the UE to decode the NPDSCH in accordance with the scheduling information provided below the indicator. In yet another example, as shown in table 320 in FIG. 3, when the network entity wants the NPDCCH order, as opposed to the Msg3 acknowledgement, the value of the NPDCCH order may be set to 1, and the value of the Msg3 acknowledgement indicator may be set to 0. This example may be used when the Time Alignment timer expires in a connected mode. As shown in table 310, if the network entity wants to acknowledge Msg3, the network entity may set the value of the Msg3 acknowledgement indicator to 1, and allocate 16 bits for the short contention resolution identifier.

Figure 4:
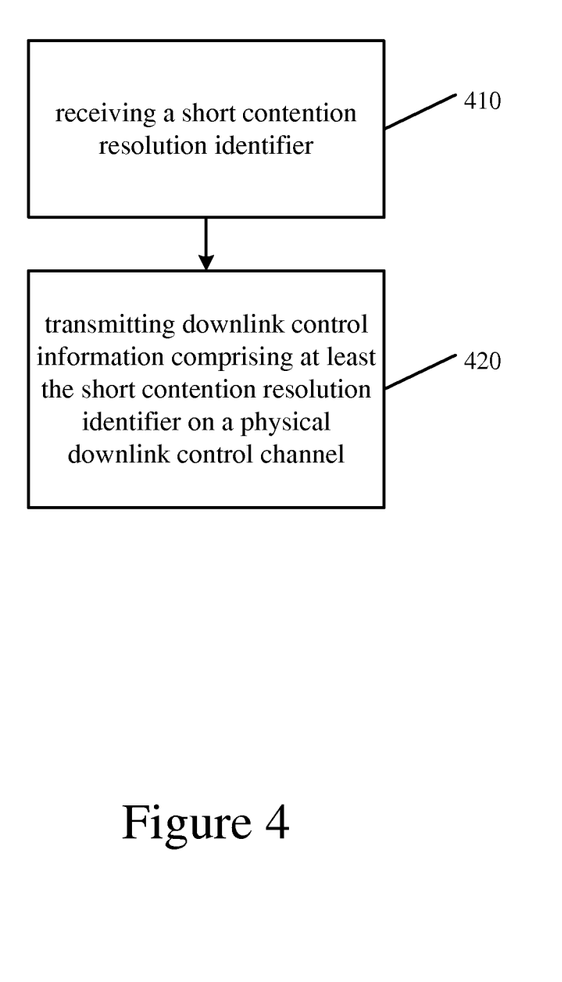
FIG. 4 illustrates an example of a method according to certain embodiments

FIG. 4 illustrates an example of a method according to certain embodiments. In particular, FIG. 4 may illustrate a method performed by a network entity, for example eNB 102 shown in FIG. 1. In step 410, a network entity, may receive a short contention resolution identifier from the user equipment. The short contention resolution identifier may be configured for an early data transmission received at the network entity. The receiving of the short contention resolution identifier by the network entity may indicate to the network entity that the UE does not expect to receive an application acknowledgement. In other words, the short contention resolution identifier may indicate that the UE does not expect an application acknowledgement. An application acknowledgement, for example, may be an acknowledgement for the application data, such as an acknowledgement from the application server. On the other hand, the hybrid automatic repeat request (HARQ) acknowledgement for Msg3 transmission may still continue. This means that the UE need not wait for further downlink packets from the network entity which may include an acknowledgement from server. In certain embodiments, the receiving of the short contention resolution identifier may be part of a Msg3 in a RACH procedure. The short contention resolution identifier, in some embodiments, may be comprised in the one or more bits of a UE identifier received from the network entity.

In step 420, the network entity may transmit to the user equipment downlink control information comprising at least the short contention resolution identifier on a PDCCH. In certain embodiments, the transmitting of the downlink control information may replace a Msg4 in a RACH procedure. The short contention resolution identifier, for example, may have a length of 16 bits. The downlink control information may set one or more bits to indicate the short contention resolution identifier. In some embodiments, the transmitting of the downlink control information allocates resources for a downlink transmission on a PDSCH when there are pending packets awaiting transmission to the UE.

Figure 5:
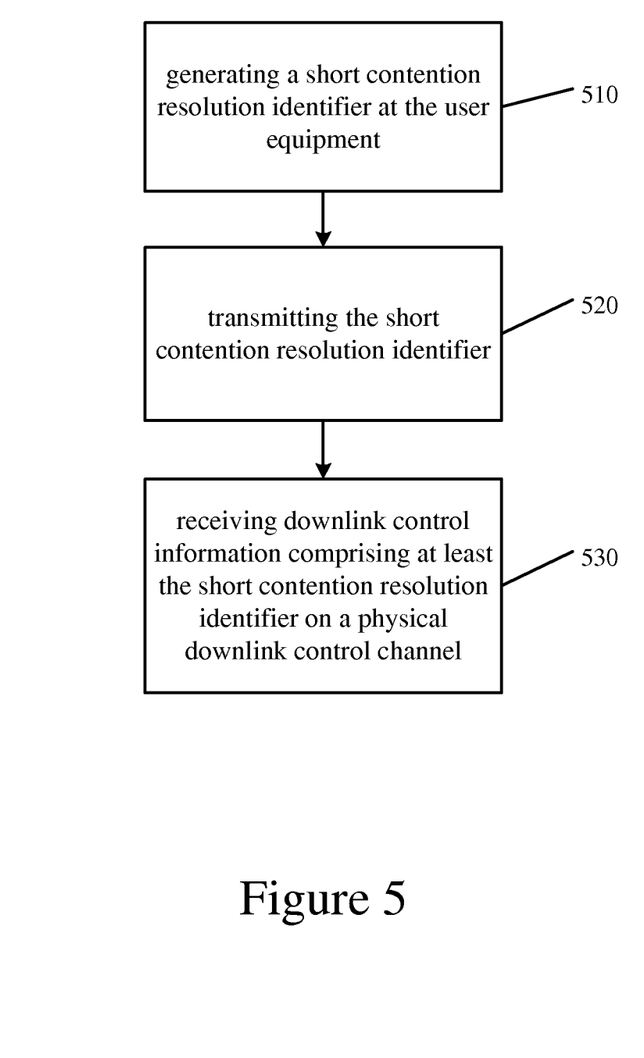
FIG. 5 illustrates an example of a method according to certain embodiments.

FIG. 5 illustrates an example of a method according to certain embodiments. In particular, FIG. 5 illustrates a method performed by a UE, such as UE 101 shown in FIG. 1. The UE described in FIG. 5 can communicate with the network entity described in FIG. 4. In step 510, the UE may generate the short contention resolution identifier. The short contention resolution identifier may be based on a random number. The random number may be hashed based on an IMSI or a S-TMSI. In another embodiment, the UE may generate the short contention resolution identifier based on one or more bits of a user identifier transmitted to the UE from the network entity. In step 520, the UE may transmit to a network entity a short contention resolution identifier. The transmitting of the short contention resolution identifier may be part of Msg3 in a random access procedure. The transmission of the short contention resolution identifier may indicate to the network entity that the UE does not expect to receive an acknowledgement. The short contention resolution identifier may be configured for an early data transmission transmitted by the UE.

In step 530, the UE receives from the network entity downlink control information comprising at least the short contention resolution identifier on a PDCCH. The receiving of the short contention resolution identifier at the UE may terminate a random access procedure. The receiving of the downlink control information may in some embodiments allocate resources for a downlink transmission on a PDSCH when there are pending packets awaiting reception at the UE. The receiving of the downlink control information may replace a Msg4 in a random access procedure. In certain embodiments, the short contention resolution identifier may be included in the one or more bits of a UE identifier transmitted from the network entity. In other embodiments, the short contention resolution identifier has a length of 16 bits. The downlink control information may set one or more bits to indicate the short contention resolution identifier. The downlink control information may indicate that the UE should release a RRC connection and move to an idle state upon the receiving of the short contention resolution identifier, or that the UE may wait to receive data specific timer duration on the PDCCH.

Figure 6:
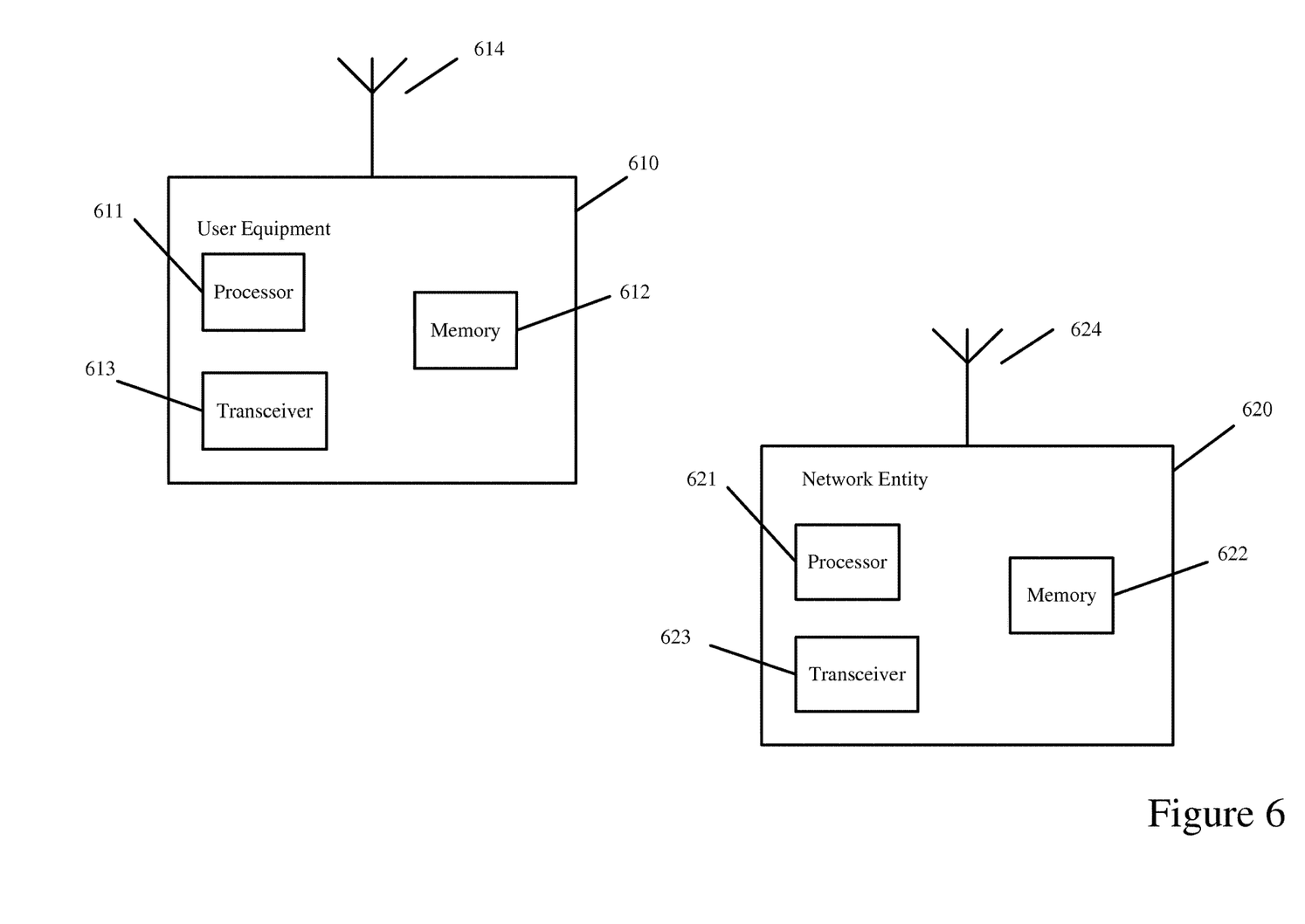
FIG. 6 illustrates an example of a system according to certain embodiments.

FIG. 6 illustrates a system according to certain embodiments. It should be understood that each table, signal, or block in FIGS. 1-5 may be implemented by various means or their combinations, such as hardware, software, firmware, one or more processors and/or circuitry. In one embodiment, a system may include several devices, such as, for example, network entity 620 or UE 610. The system may include more than one UE 610 and more than one network entity 620. Network entity 620 may be a base station, an access point, an access node, an eNB, a 5G or New Radio NodeB, a server, a host, or any other network entity that may communicate with the UE.

Each of these devices may include at least one processor or control unit or module, respectively indicated as 611 and 621. At least one memory may be provided in each device, and indicated as 612 and 622, respectively. The memory may include computer program instructions or computer code contained therein. One or more transceiver 613 and 623 may be provided, and each device may also include an antenna, respectively illustrated as 614 and 624. Although only one antenna each is shown, many antennas and multiple antenna elements may be provided to each of the devices. Other configurations of these devices, for example, may be provided. For example, network entity 620 and UE 610 may be additionally configured for wired communication, in addition to wireless communication, and in such a case antennas 614 and 624 may illustrate any form of communication hardware, without being limited to merely an antenna.

Transceivers 613 and 623 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network entity deliver local content. One or more functionalities may also be implemented as virtual application(s) in software that can run on a server.

A user device or UE 610 may be a mobile station (MS), such as a mobile phone or smart phone or multimedia device, an IoT cellular device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the user equipment may be replaced with a machine communication device that does not require any human interaction, such as a sensor, meter, or robot.

In some embodiments, an apparatus, such as a user equipment or a network entity, may include means for carrying out embodiments described above in relation to FIGS. 1-5. In certain embodiments, at least one memory including computer program code can be configured to, with the at least one processor, cause the apparatus at least to perform any of the processes described herein.

Processors 611 and 621 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 612 and 622 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 620 or UE 610, to perform any of the processes described above (see, for example, FIGS. 1-5). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

In certain embodiments, an apparatus may include circuitry configured to perform any of the processes or functions illustrated in FIGS. 1-5. Circuitry, in one example, may be hardware-only circuit implementations, such as analog and/or digital circuitry. Circuitry, in another example, may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

Furthermore, although FIG. 6 illustrates a system including a network entity 620 and UE 610, certain embodiments may be applicable to other configurations, and configurations involving additional elements, as illustrated and discussed herein. For example, multiple user equipment devices and multiple base stations may be present, or other nodes providing similar functionality, such as nodes that combine the functionality of a user equipment and a base station, such as a relay node. The UE 610 may likewise be provided with a variety of configurations for communication other than communicating with network entity 620. For example, the UE 610 may be configured for device-to-device, machine-to-machine, or vehicle-to-vehicle communication.

The above embodiments provide for significant improvements to the functioning of a network and/or to the functioning of the network entities within the network, or the user equipment communicating with the network. For example, the above embodiments may use a shorter contention resolution identifier, and transmit the shorter contention resolution identifier via the PDCCH. Doing so may allow the RACH procedures to terminate faster, thereby allowing the UE to enter sleep mode earlier. This helps to improve the battery life of the UE, as well as limit the network resources used by the UE. Transmitting the contention resolution identifier on the PDCCH also allows for improving resource efficiency by avoiding allocating PDSCH resources for transmission of Msg4. Certain embodiments may therefore allow the network entity flexibility to decide early termination of the RACH or data packet transmission on Msg4 via PDSCH. The improvement to the downlink resource efficiency may depend on the early data transmission traffic load in the network. In addition, certain embodiments may be utilized without any physical layer impact on the UE or the network entity.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. Although the above embodiments refer to further enhanced Machine Type Communication, the above embodiments may apply to any other 3GPP technology or non-3GPP technology, such as IoT technology, LTE, LTE-advanced, fourth generation (4G) technology, and/or fifth generation (5G) technology, New Radio technology, or Carrier Aggregation technology.

Partial Glossary

3GPP Third Generation Partnership Project
NB-IoT Narrowband IoT
LTE Long Term Evolution
LTE-A LTE-Advanced
NPRACH Narrowband Physical Random Access Channel
eNB enhanced NodeB
PDCCH Physical Downlink Control Channel
PSDCH Physical Shared Data Channel
UE User Equipment
C-RNTI Cell Radio Network Temporary Identifier
DCI Downlink Control Information
IMSI International Mobile Subscriber Identity
S-TMSI System Architecture Evolution Temporary Mobile Subscriber Identity
SGSN Serving GPRS Support Node

I claim:

1. A method comprising:
transmitting from a user equipment to a network entity a short contention resolution identifier, wherein the transmission of the short contention resolution identifier indicates to the network entity that the user equipment does not expect to receive an application acknowledgement; and
receiving at the user equipment from the network entity downlink control information comprising at least the short contention resolution identifier on a physical downlink control channel.

2. The method according to claim 1, wherein the receiving of the short contention resolution identifier at the user equipment terminates a random access procedure.

3. The method according to claim 1, wherein the short contention resolution identifier is configured for an early data transmission transmitted to the network entity.

4. An apparatus comprising:
at least one memory comprising computer program code; and
at least one processor,
wherein the at least one memory and the computer program code are configured, with the at least one processor, to cause the apparatus at least to:
receive from a user equipment a short contention resolution identifier, wherein the receiving of the short contention resolution identifier indicates to the apparatus that the user equipment does not expect to receive an application acknowledgement; and
transmit to the user equipment downlink control information comprising at least the short contention resolution identifier on a physical downlink control channel.

5. The apparatus according to claim 4, wherein the short contention resolution identifier is configured for an early data transmission received at the apparatus.

6. The apparatus according to claim 4, wherein the receiving of the short contention resolution identifier is part of a message 3 in a random access procedure.

7. The apparatus according to claim 4, wherein the short contention resolution identifier is comprised in one or more bits of a user equipment identifier transmitted by the apparatus.

8. An apparatus comprising:
at least one memory comprising computer program code; and
at least one processor,
wherein the at least one memory and the computer program code are configured, with the at least one processor, to cause the apparatus at least to:
transmit to a network entity a short contention resolution identifier, wherein the transmission of the short contention resolution identifier indicates to the network entity that the apparatus does not expect to receive an application acknowledgement; and
receive from the network entity downlink control information comprising at least the short contention resolution identifier on a physical downlink control channel.

9. The apparatus according to claim 8, wherein the receiving of the short contention resolution identifier at the apparatus terminates a random access procedure.

10. The apparatus according to claim 8, wherein the short contention resolution identifier is configured for an early data transmission transmitted to the network entity.

11. The apparatus according to claim 10, wherein the short contention resolution identifier comprises a forty-bit user equipment identifier for user equipment context identification.

12. The apparatus according to claim 8, further comprising:
generating the short contention resolution identifier at the apparatus based on a random number, wherein the random number is hashed based on an international mobile subscriber identity or a system architecture evolution temporary mobile subscriber identity; or
generating the short contention resolution identifier at the apparatus based on one or more bits of a user identifier transmitted to the apparatus from the network entity.

13. The apparatus according to claim 8, wherein the transmitting of the short contention resolution identifier is part of a message 3 in a random access procedure, or the receiving of the downlink control information replaces a message 4 in a random access procedure.

14. The apparatus according to claim 8, wherein the downlink control information sets one or more bits to indicate the short contention resolution identifier.

15. The apparatus according to claim 8, wherein the short contention resolution identifier has a length of 16 bits.

16. The apparatus according to claim 8, wherein the receiving of the downlink control information allocates resources for a downlink transmission on a physical downlink shared channel when there are pending packets awaiting reception at the apparatus.

17. The apparatus according to claim 8, wherein the downlink control information indicates that the apparatus should release a radio resource control connection and move to an idle state upon the receiving of the short contention resolution identifier or that the apparatus has to wait to receive data specific timer duration on the physical downlink control channel.

\* \* \* \* \*